(12) United States Patent
Hwang et al.

(10) Patent No.: US 8,177,401 B2
(45) Date of Patent: May 15, 2012

(54) LIGHT GUIDE TURN SIGNAL INDICATOR REAR VIEW MIRROR

(75) Inventors: Hyok-Joo Hwang, Bucheon (KR); Kwang-Ryeol Park, Bupyeong-gu Incheon (KR)

(73) Assignee: SMR Patents S.a.r.l., Luxembourg (LU)

( * ) Notice: Subject to any disclaimer, the term of this patent is extended or adjusted under 35 U.S.C. 154(b) by 17 days.

(21) Appl. No.: 12/839,710

(22) Filed: Jul. 20, 2010

(65) Prior Publication Data

US 2011/0013409 A1     Jan. 20, 2011

(30) Foreign Application Priority Data

Jul. 20, 2009   (EP) ..................................... 09165897

(51) Int. Cl.
*B60Q 1/26*        (2006.01)

(52) U.S. Cl. ........................................ 362/494; 362/511

(58) Field of Classification Search .................. 362/494, 362/511; 359/838, 839
See application file for complete search history.

(56) References Cited

U.S. PATENT DOCUMENTS

| | | | | |
|---|---|---|---|---|
| 5,774,283 A | * | 6/1998 | Nagel et al. | ..................... 359/838 |
| 6,416,208 B2 | * | 7/2002 | Pastrick et al. | ................ 362/494 |
| 7,188,981 B2 | * | 3/2007 | Rodriguez Barros et al. | .............................. 362/494 |
| 7,255,464 B2 | | 8/2007 | Barros et al. | |
| 2004/0105264 A1 | * | 6/2004 | Spero | ............................. 362/276 |
| 2008/0089080 A1 | | 4/2008 | Kawaji et al. | |

FOREIGN PATENT DOCUMENTS

| | | |
|---|---|---|
| EP | 1918159 | 5/2008 |
| JP | 2004001710 | 1/2004 |
| WO | 2009050855 | 4/2009 |

OTHER PUBLICATIONS

European Search Report for application No. 09165897.1-1523 dated Dec. 16, 2009.

* cited by examiner

*Primary Examiner* — Ali Alavi

(74) *Attorney, Agent, or Firm* — Reising Ethington P.C.

(57) ABSTRACT

The invention is related to an exterior rear view mirror assembly with a mirror base and a mirror head comprising at least one of the following features as mirror glass, mirror glass actuator, power fold actuator, lighting elements, indicators and at least one opening for a turn signal indicator light module. The assembly comprises a housing covered by a lens, at least one light guide with a first LED feeding light into the cross sectional area of the light guide, and at least a second LED placed apart the light guide, wherein a decorative, none reflective garnish is fixed between none reflective housing and transparent lens.

4 Claims, 6 Drawing Sheets

SECTION A-A

LIGHT GUIDE TURN SIGNAL INDICATOR REAR VIEW MIRROR

BACKGROUND ART

The invention is based on a priority patent application EP 09165897.1 which is hereby incorporated by reference.

FIELD OF THE INVENTION

The invention is related to an exterior rear view mirror for vehicles with a turn signal indictor allocated in the mirror head.

The invention is also related to a turn signal indication module that is inserted in an opening of the mirror head cover or between mirror cover elements.

DESCRIPTION OF THE RELATED ART

Solutions with turn signal indicators in the mirror head of an exterior rear view mirror have been known for quite some time. The first solutions comprised signal light bulbs placed at different positions of the rear view mirror. With the availability of LEDs as light sources for turn signal indication devices these indicators also included light guides.

In U.S. Pat. No. 7,225,464 many different rear view mirror designs are disclosed using a light guide in some embodiments to emit light in forward direction of the vehicle In the embodiments of FIG. 98 and FIG. 99 of this prior art, a design is shown with a light guide and additional LED sources.

The disclosed solution uses reflector structures to concentrate light versus the transparent lens. The use of reflectors was state of the art at this time.

In EP1918159A2 a solution with decorative garnish is disclosed where the garnish has openings for LEDs to shine through. The solution does not comprise a light guide.

In WO2009/050855 a solution with a light guide in a turn signal is disclosed. The LED sources feed their light all into a light guide that is fixed in a garnish along its longitudinal extension.

The invention avoids the use of reflectors for reasons of clear light emission definition and for cost reasons. The light emitted via reflectors is at least reflected backwards from lens structure once. The light emission is overlaid by direct emission of light guide through the lens and the reflected part. The reflected part is first reflected by the lens and than by the reflector, the light path is disturbed and the light emission is in result diffuse.

To avoid this drawback the invention provides a solution with two separate parts wherein the relevant light sources emit light undisturbed and not overlaid be each others.

SUMMARY OF THE INVENTION

The invention provides a solution for a rear view mirror with turn signal indicator and a garnish element without any reflective function.

It is advantageous that the garnish is used for the fixation of the light guide in the housing.

It is advantageous that the garnish has an opening for the light guide, so that the light guide is visible through the lens.

It is advantageous that that fixation is at least at the end of the light guide facing away from the vehicle and blocking at least a part of light travelling along the light guide with a transverse joint. This solution improves a well defined lighting profile for the turn signal indicator.

It is advantageous that the second LED is placed at the vertex of rear view mirror in front of the transverse joint to improve the forward light emission and to define the angle between vehicle's long axis and the light emission to the 15° that are allowed under several regulations.

It is advantageous that the second LED is placed at the vertex of rear view mirror behind of the transverse joint with an opening to shine through. This solution has in addition the advantage that the printed circuit board of the second LED can be mounted in the garnish structure.

In another advantageous embodiment, a second LED is installed on a printed circuit board that blocks light travelling along the light guide. This embodiment allows the effective blocking of light from light guide and the printed circuit board is mounted in the turn signal indicator housing itself.

BRIEF DESCRIPTION OF THE DRAWINGS

The invention is shown in the figures and shortly described there after.

DETAILED DESCRIPTION OF THE DRAWINGS

Figure 1:
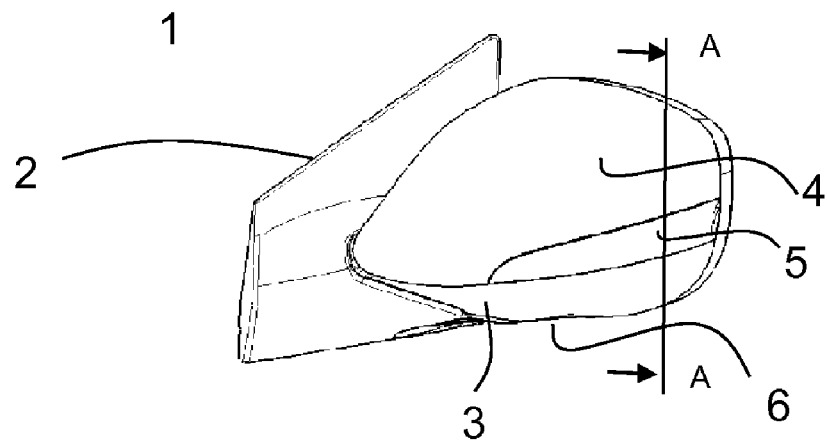
FIG. 1 shows a rear view mirror assembly

In FIG. 1, a rear view mirror assembly 1 is shown schematically. The rear view mirror assembly 1 comprises two main parts a mirror base 2 and a mirror head 3. The mirror head 3 hosts a reflective glass surrounded by a bezel, which is not visible in this view. The mirror head includes a support plate for the mirror glass 7 that is mounted pivotable to the mirror base. All mechanical components are covered with plastic covers. A mirror head upper cover 4 and a mirror head lower cover 6 forms an opening 5 for a lighting module. In this embodiment, a turn signal indicator module is inserted into the opening 5 between the mirror covers 4, 6. This example shows a solution with two cover parts but the invention can be applied also to rear view mirror assemblies with one plastic mirror head cover with an opening for insertion of a turn signal indicator. The turn signal indicator follows the outer contour of the mirror cover 4, 6 and forms a longitudinal elongated module. The turn signal indicator range from the side of the rear view mirror 6 attached to the vehicle to the outer side of the rear view mirror 1 and forms a longitudinal elongated module.

Figure 2:
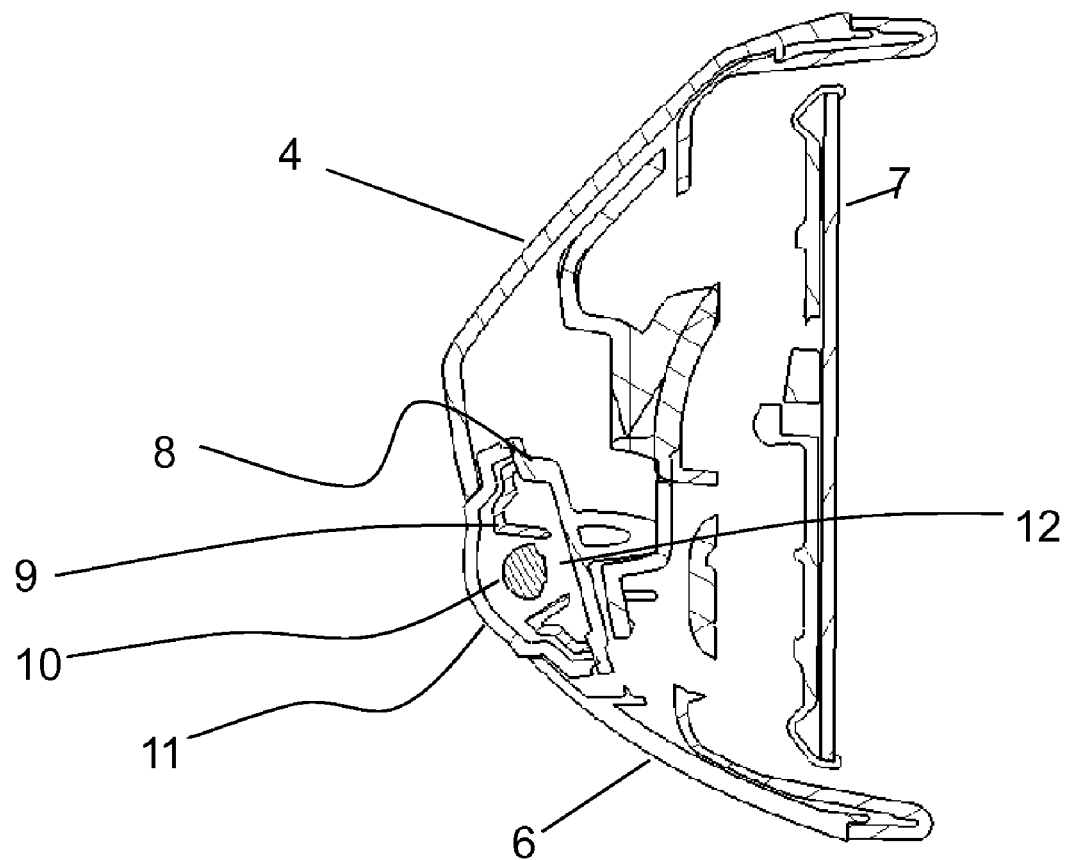
FIG. 2 shows a cross section along the axis A-A of FIG. 1

FIG. 2 shows a cross section through A-A of the rear view mirror assembly 1. The mounting device of the reflective glass 7 is only shown schematically. The two mirror head cover parts 4 and 6 form an opening 5 in which a housing 8 of the turn signal indicator is installed. The housing 8 is covered by a transparent lens 11, that can be a simple transparent structure or a lens including optical elements as Fresnel lens structure to optimize the lighting profile. Also other structures are possible to couple light out form the turn signal indicator module. The housing 8 includes a garnish 9 and a waveguide 10.

Figure 3:
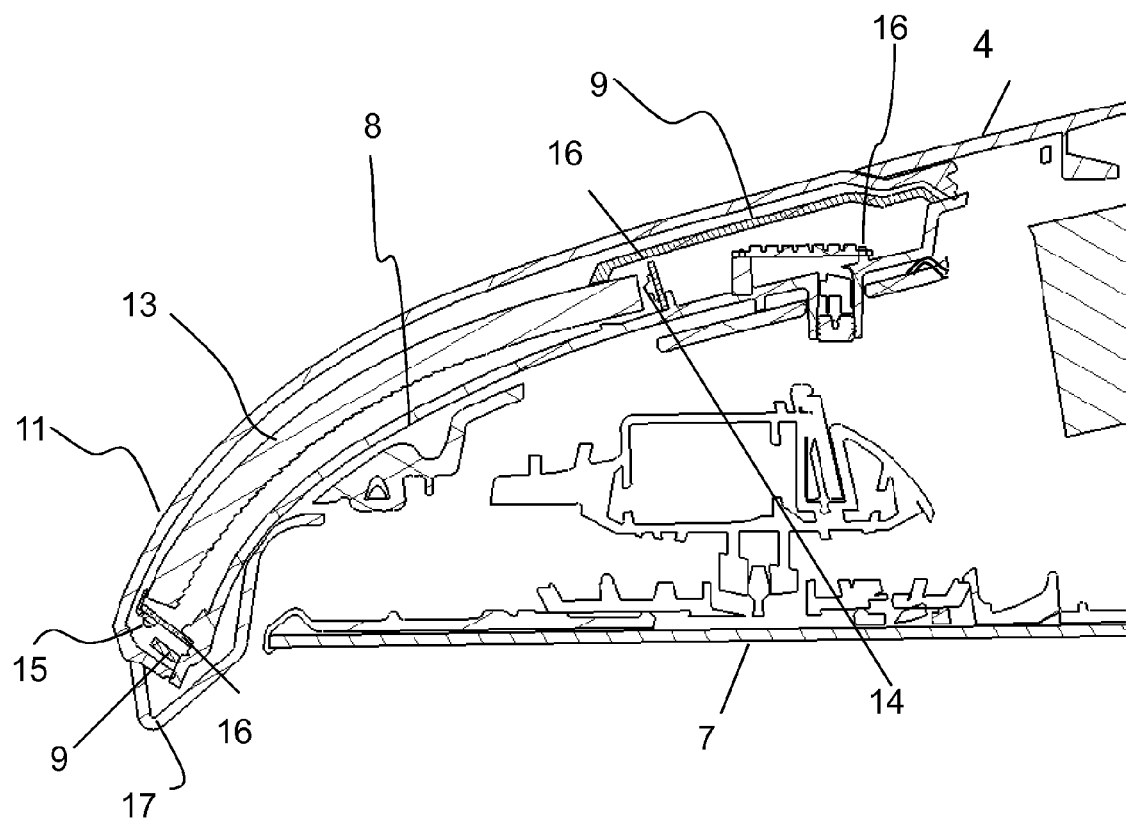
FIG. 3 shows a cross section along the long axis of the rear view mirror assembly

FIG. 3 shows a cross section along the long axis of rear view mirror assembly 1. The turn signal indicator housing 8 is integrated into the cover 4 of the mirror head 3 and a bezel 17 of the mirror head 3 surrounding the reflective glass 7. The housing 8 of the turn signal indicator hosts garnish 9 that is visible through the covering transparent lens 11. The garnish 9 supports the waveguide 10 having an optical structure 13. This optical structure 13 is a structure of grids or teeth that allows light to be deflected out of the light guide 10. Teeth and a grid may be integrated at the front side of the light guide visible through the lens or on the rear side of the light guide 10. The light guide 10 is mounted at least along a part of the elongated turn signal mirror housing and follows the outer contour of the rear view mirror as the lens does. In a preferred embodiment the lens and the light guide are mounted as parallel elongated part.

The light guide 10 is fed by a first LED 14 which emits light to the end surface of the light guide. The first LED 14 is supported by a printed circuit board 16 that is mounted in the turn signal housing 8. A second LED 15 is place apart in the vertex of the turn signal indictor. In this example the printed circuit board 16 with the second LED 15 is also fixed in the turn signal indicator housing directly in front of the end of the wave guide 10. The end of the waveguide is therefore blocked by the printed circuit board and light cannot be emitted through the lens is a rear direction. The light emitted through the lens in rear direction is solely emitted by the second LED 15.

Figure 4:
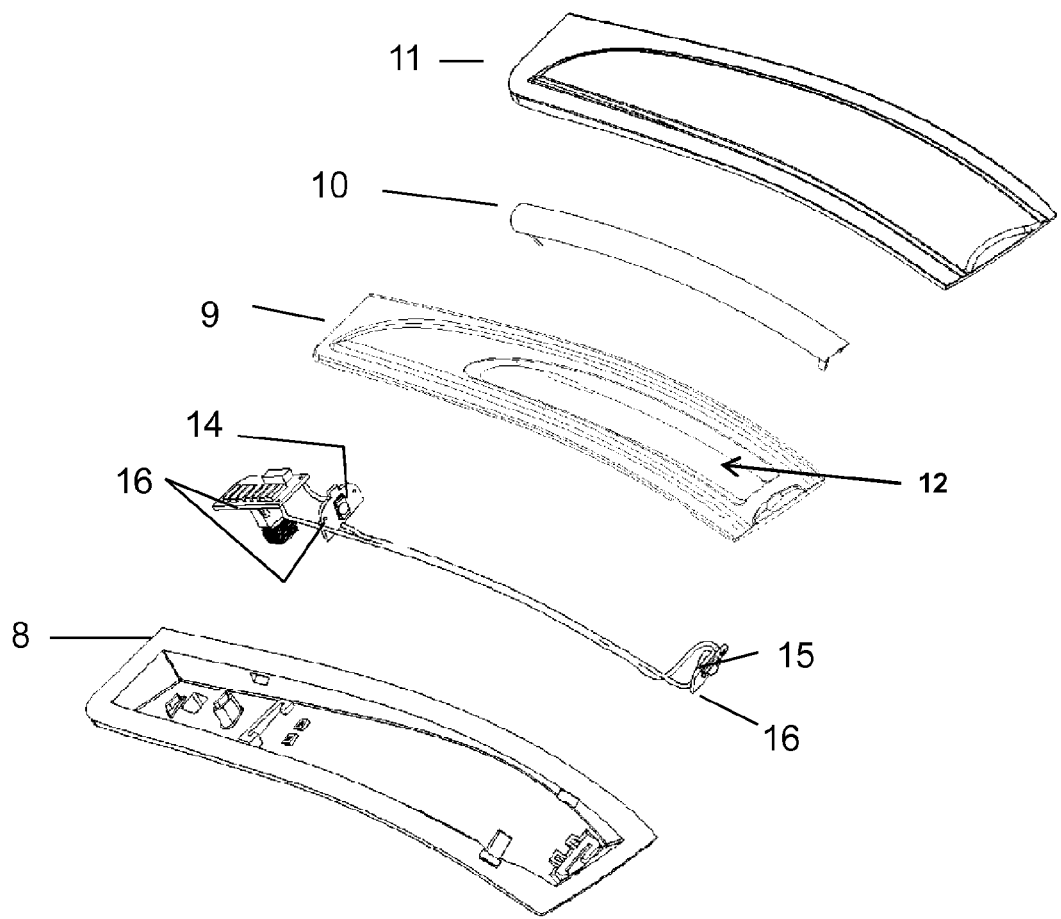
FIG. 4 is an exploded perspective view of a turns signal indictor

FIG. 4 shows another arrangement of elements being from top to bottom a lens, a waveguide 10, a garnish 9 with an opening 12 a printed circuit device with first LED 14 and a second LED 15 and a housing 8. The printed circuit board 16 has a three part structure with a first part hosting the connection to the vehicles' electrical system and the driver electronics, a second part for the first LED that feed light into the light guide and a third part on that the second LED 15 is mounted. The parts are connected by electrical wires.

Figure 5:
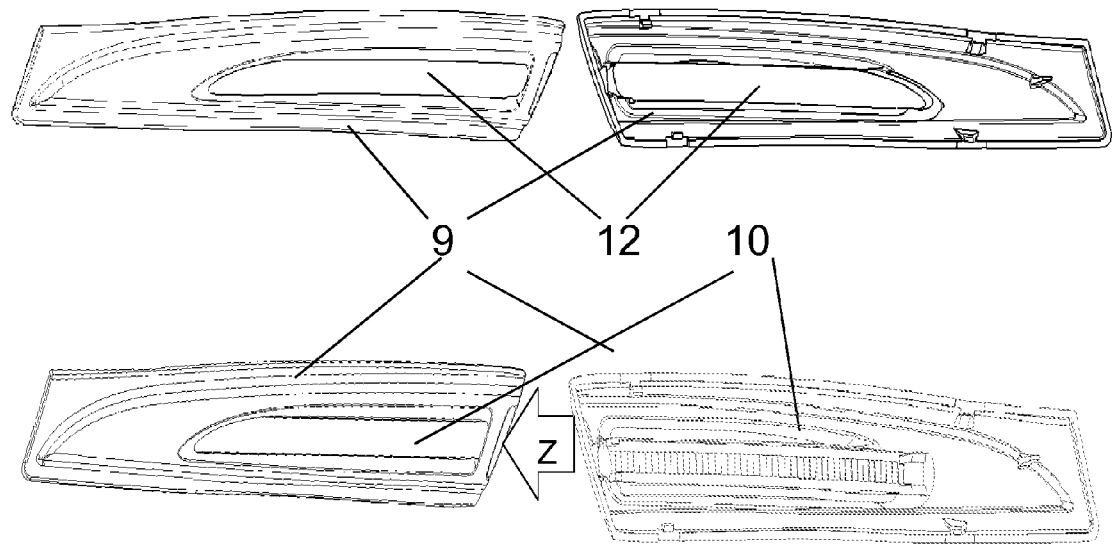
FIG. 5 shows a garnish and waveguide structure
Figure 6:
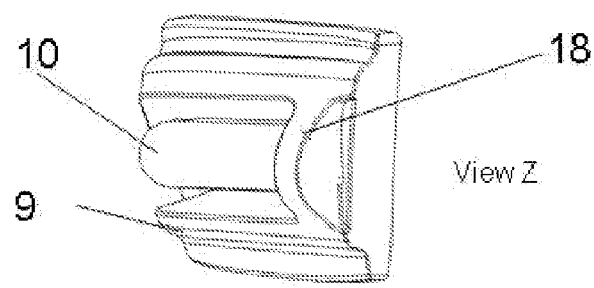
FIG. 6 shows the garnish in a special view

The installation and fixation of the wave guide 10 can be seen in FIG. 5. and FIG. 6. On the left side, the top view without and with waveguide is shown; on the right side the rear view of garnish without and with waveguide. The waveguide is visible through the opening 12 of the garnish. The waveguide is fixed at least at one end, the exterior end. In this embodiment, the view Z from the vertex side of the rear view mirror assembly shows that the garnish is blocking the end facet of the waveguide completely, see FIG. 6. In such an embodiment the light of the waveguide 10 can not be seen in the light traveling direction of the light guide. To avoid that too much light is blocked by the garnish the light guide is structured without coupling devices so that light is coupled out along the longitudinal structure. The second LED 15 would be placed in front of the garnish structure forming a transverse joint 18.

The garnish 9 forms with the opening and the transverse joint 18 a well defined position in which the wave guide is mounted through installation. The form and the structure of the garnish defines the light appearance of the turn signal indicator.

It is possible to form a structure in the transverse joint to mount the printed circuit board of LED 15. This is realized by a slot or hooks that can hold the printed circuit board of the second LED 15.

The turn signal indictor module includes at least two printed circuit boards for the at least two LEDs that are mounted in the housing or in the garnish. To ease production the mounting of the printed circuit boards is either in the housing or in the garnish. The parts must be prepared to fix the PCBs. For the PCBs are connected by wires and installed as one entity the fixation means must be designed in a way that the electrical device can be mounted easily and as a whole. So the necessary slot and clips must be prepared during molding process of the garnish.

The garnish is a plastic material part which has an attractive surface to design a rear view mirror assembly. The garnish can be colored plastic or have a colored surface. It is also possible to use a metal surface to have an elegant appearance. This could be aluminum coating. It must be clear that this metal surface does not reflect light, the surface is only for the look not for function. The light emission of the light guide and the second LED 15 is not reflected by the garnish.

The housing of the turn signal indicator module is also formed in plastic. The housing is a black material that is not coated to reflect light. The whole module does not include elements for light reflection. Only the total refection of light in the light guide is used.

Figure 7:
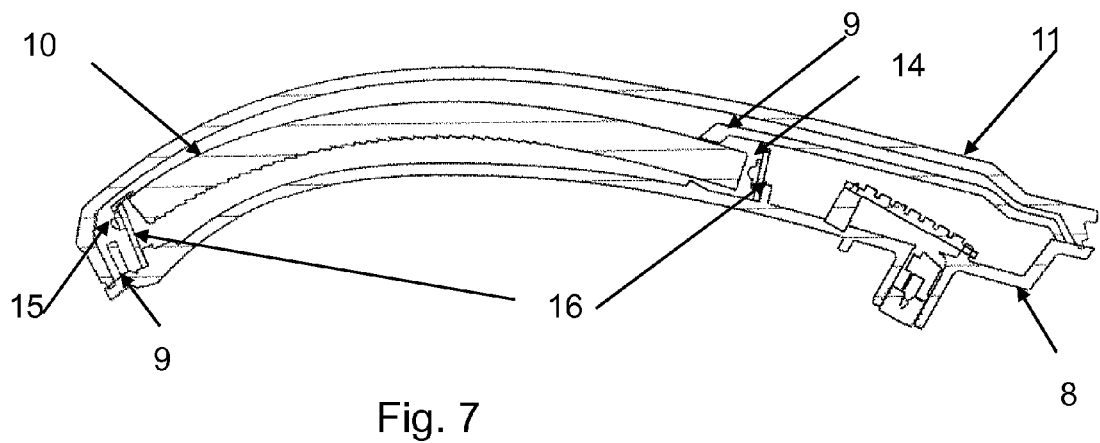
FIG. 7 shows a cross section along the long axis of the turn signal indicator module
Figure 8:
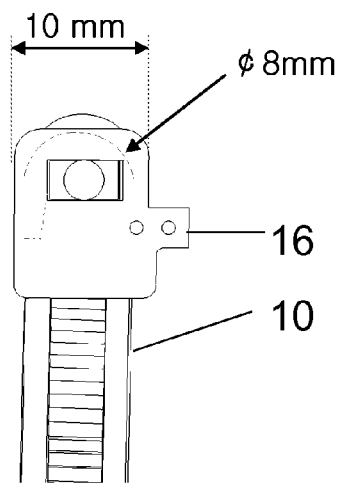
FIG. 8 shows a front view on the tip of the turn signal indicator module

FIG. 7 shows a cross section simplified to show the main elements. The waveguide is hosted in the garnish 9 in the housing 8 covered by the lens 11. In the view of FIG. 8 the end tip of the waveguide is shown. The printed circuit board 16 of the second LED 15 blocks the light guide end facet 10 effectively. The size of the blocking PCB is bigger than the size of the end facet of waveguide 10. Due to the structures of the waveguide that are visible as rips the light is coupled out along the waveguide and only a minimum of light power must be blocked, The printed circuit board is the platform for the second LED 15 which can emit light in a better definite way as it is emitted at the end facet of the light guide. The legal requirements are related to the light that is emitted at the end of the turn signal indicator module and must have definite angle and a definite power to be accepted.

Figure 9:
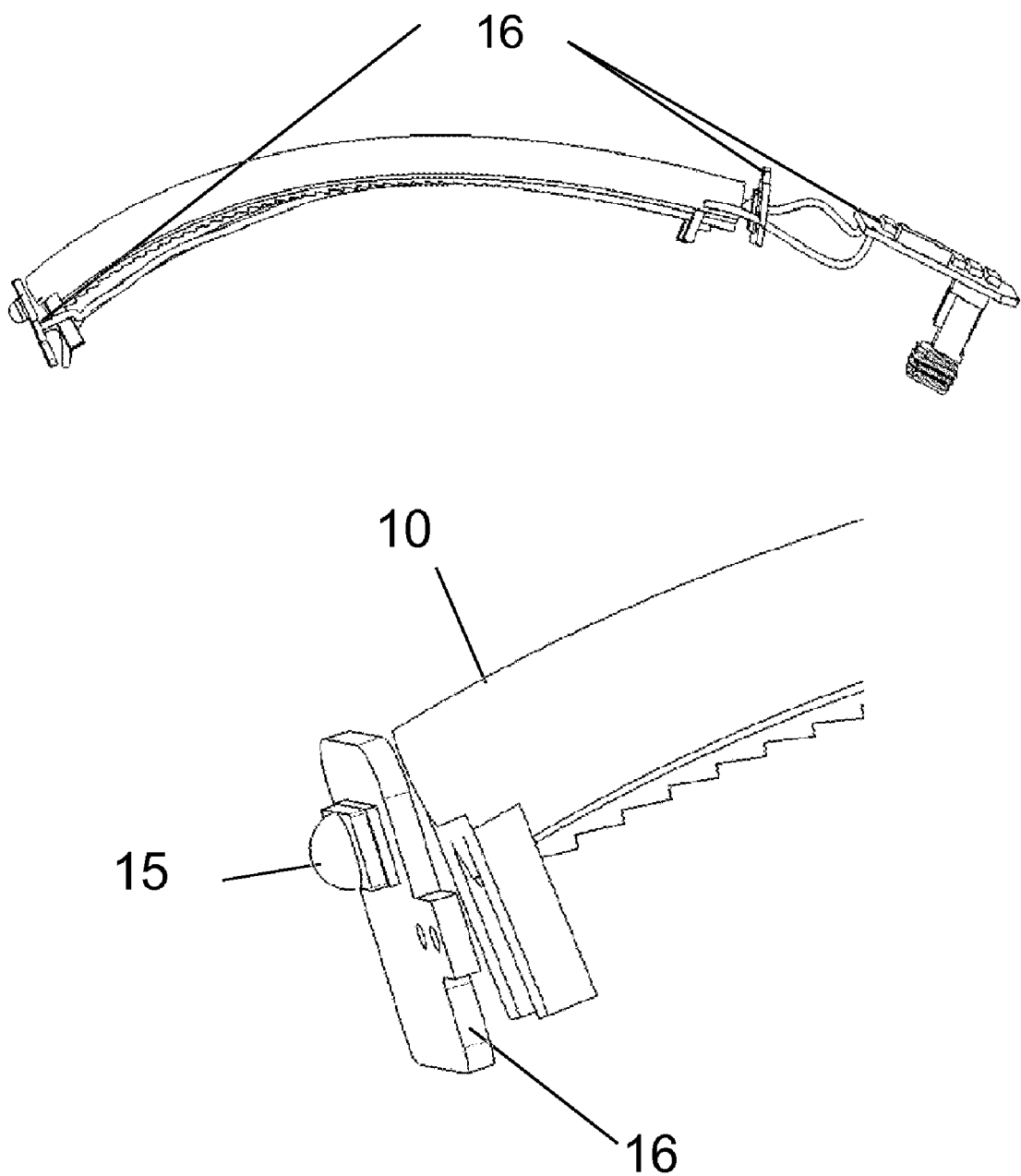
FIG. 9 shows a detail of the waveguide and the printed circuit boards.

FIG. 9 shows the end of waveguide and the blocking printed circuit board again. The printed circuit boards of the LEDs are connected by wires and connected in this embodiment with a third printed circuit board that includes the electronic components to control and drive LEDs.

LEGEND

1 rear view mirror assembly
2 mirror base
3 mirror head
4 mirror head upper cover
5 mirror head opening
6 mirror head lower cover
7 reflective glass
8 Turn signal housing
9 garnish
10 light guide
11 lens
12 opening in garnish
13 optical structure of light guide
14 first LED
15 second LED
16 printed circuit board PCB
17 bezel
18 transverse joint

We claim:

1. Exterior rear view mirror assembly with a mirror base and a mirror head comprising at least one of the following features as mirror glass, mirror glass actuator, power fold actuator, lighting elements, indicators and at least one opening for a turn signal indicator light module comprising a housing covered by a transparent lens, at least one light guide with a first LED feeding light into the cross sectional area of the light guide, and travelling along the light guide to the vertex of the exterior rear view mirror assembly and at least a second LED placed apart the light guide, wherein a decorative, non-reflective garnish is fixed between the non-reflective housing and the transparent lens and the garnish has an opening for the light guide, so that the light guide and the surface of the garnish is visible through the lens and wherein the garnish fixes the light guide and fixation is at least at the end of the light guide facing away from the vehicle and blocking at least a part of light travelling along the light guide with a transverse joint.

2. Exterior rear view mirror assembly according claim 1 characterized in that the second LED is placed at the vertex of rear view mirror in front of the transverse joint.

3. Exterior rear view mirror assembly according claim 1 characterized in that the second LED is placed at the vertex of rear view mirror behind the transverse joint.

4. Exterior rear view mirror assembly according claim 1 characterized in that the second LED is installed on a printed circuit board blocking light travelling along the light guide.

* * * * *